UNITED STATES PATENT OFFICE.

JOHN J. NATZMAN, OF DETROIT, MICHIGAN.

COMPOUND FOR USE IN SOLDERING ALUMINUM AND PROCESS OF FORMING SAME.

1,032,494.  Specification of Letters Patent.  Patented July 16, 1912.

No Drawing.  Application filed April 26, 1912. Serial No. 693,420.

*To all whom it may concern:*

Be it known that I, JOHN J. NATZMAN, a citizen of the United States of America, residing at Detroit, in the county of Wayne and State of Michigan, have invented certain new and useful Improvements in Compounds for Use in Soldering Aluminum and Processes of Forming Same, of which the following is a specification, reference being had therein to the accompanying drawings.

The invention relates to compounds for use in soldering aluminum, and consists in the composition and method of forming same as hereinafter set forth.

In the formation of my compound I mix nitric, sulfuric and hydrochloric acids preferably in equal proportions, and add to the mixture a small quantity of rosin; I then add an excess of aluminum by inserting a small fragment of metallic aluminum and permitting it to remain until reaction ceases. In a separate vessel I then place nitric acid and add a small quantity of rosin, and in a third vessel mix nitric and hydrochloric acids in equal proportions, adding rosin to this mixture also. I then combine the three mixtures in equal proportions, the resulting combination being then ready for use.

The surfaces to be soldered are first cleaned with this compound, which may either be applied with a swab or the metal may be dipped in the solution. After cleaning, the adhering liquid is wiped off to dry the surface and a small quantity of powdered rosin is sprinkled on. The cleaned surfaces are then coated, preferably with metallic zinc which may be applied with an ordinary soldering iron. I have found that where the surfaces are treated in the manner above described the zinc will readily adhere to the surfaces, after which the soldering may be completed by the use of any ordinary solder.

While I do not fully understand the nature of the chemical reaction that takes place in carrying out my process, practical tests have proven conclusively that aluminum surfaces so treated can be easily soldered.

What I claim as my invention is:

1. A compound for use in soldering aluminum, comprising a mixture of nitric, sulfuric and hydrochloric acids with a small quantity of rosin and a small quantity of aluminum dissolved in said acids.

2. A compound for use in soldering aluminum comprising a mixture of nitric, sulfuric and hydrochloric acids, with a small quantity of rosin and a small quantity of aluminum dissolved in said acids, and an additional quantity of free nitric and hydrochloric acids.

3. A process for forming a compound for use in soldering aluminum which consists in mixing nitric, sulfuric and hydrochloric acids, adding a small quantity of rosin thereto and metallic aluminum in excess and then adding an additional quantity of free nitric and hydrochloric acids.

In testimony whereof I affix my signature in presence of two witnesses.

JOHN J. NATZMAN.

Witnesses:
 FRANK NATZMAN,
 THOMAS A. GARYEFSKI.